Dec. 30, 1930.   J. H. HUNT   1,787,075
SPOKE END CAP CONSTRUCTION
Filed Dec. 23, 1927

INVENTOR:
J. HAROLD HUNT.
BY
ATTORNEY.

Patented Dec. 30, 1930

1,787,075

UNITED STATES PATENT OFFICE

J HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA

SPOKE-END-CAP CONSTRUCTION

Application filed December 23, 1927. Serial No. 242,036.

The spoke end cap of my invention is a sheet metal cap. Sheet metal spoke end caps have the advantages of exceedingly low cost, lightness, adaptability, smooth and finished contours and easy entry and snug fitting of the spoke end.

My object is to devise a sheet metal construction and to so combine it with the spoke and the rim as to retain all these advantages yet at the same time add others to those. These others are the increased rigidity and strength, preassembly with the rim rather than with the spoke ends, adaptability to attachment without special formation on the rim, securement by that extremely economical means, electric welding, and a freedom from sharp edges such as may cut into the wood or otherwise mar the wooden spoke assembled therewith.

In the drawings I show that form of my invention now best known to me but it is also known to me that there are a number of modifications of this idea and that yet others are feasible.

Figure 1:
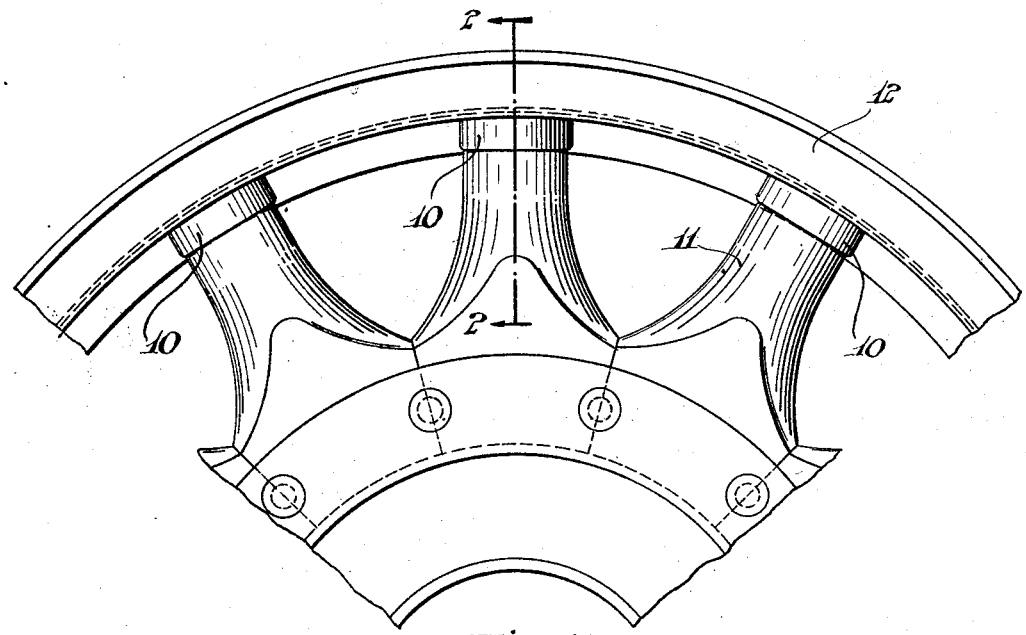
Figure 1 is a front elevation of a segmental section of a complete wheel in which the spoke end cap construction of my invention is embodied.

10 are the spoke end caps per se. 11 are the spokes. 12 is the rim. The rim 12 is of the well known standard construction. So also are the spokes 11 insofar as the ends of these spokes are provided with tenons 13 and intermediate the tenons 13 and the bodies of the spokes a transversely extending shoulder 14 is provided. The rims 12 are usually apertured at the spoke ends and the tenons 13 projected through the apertures in the same manner as in wheel felloes, while the shoulder 14 bears substantially against the body, as against the under side of the wheel felloe. This is so even when the spoke end caps are used, separation of the tenon 13 and shoulder 14 from the rim or felly in such case being by the sheet metal thickness of the spoke end cap where sheet metal caps are used.

But the spoke of my invention ends inside of the rim. The end of the tenon 13 and shoulder 14 both lie inside of the rim 12. The spoke end cap 10 is intervened between the end of the spoke and the inside of the rim 12.

The spoke end cap 10 comprises double side walls 15—16 which surround the tenon portion 13, at least one of the side walls at the top of the cap is provided with a transversely extending portion 17 through which connection may be made to the rim by welding or riveting, preferably by welding. The two side walls 15—16 are spaced apart at their top edges and connected together by a transverse portion 18 constituting an abutment or shoulder coacting with shoulder 14 of the spoke end. The whole is stamped from sheet metal in one piece and thereby provided with smoothly flowing lines and well rounded corners such as 19. The reverse bending of the side walls is very readily accomplished in die stamping. Both the inner and outer side walls 15—16 are contoured at their upper ends to bear against the inner surface of the rim 12 throughout their extent.

Figure 2:
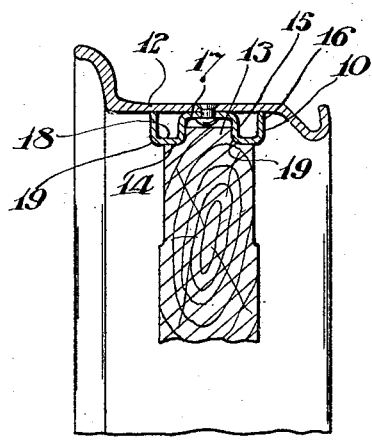
Figure 2 is a central transverse section of the construction associated with a single spoke taken on line 2—2 of Figure 1.

In assembly the spoke end caps are first attached to the rim. The assembly and attachment may be individual for each cap or collective for the entire number of caps for a given wheel. The welding or riveting to the rim is through the transversely extending attaching portion 17 as shown in Fig. 2.

The tenons of the outer ends of the spokes are then inserted into the open upper or inner ends of the rim attached caps, and with their opposite or hub ends axially displaced from their final positions as in common practice. Thereby by axially moving the hub ends of the spokes to their proper axial position with respect to the rim, complete entry of the tenon 13 in the spoke end cap and complete shouldering of spokes against part 18 of the cap is effective.

Smoothness of entry, free from damage to the spoke, is assured by the smooth lines and well rounded corners of the upper edges of the cap. Smoothness and neatness of external appearance is assured by the smooth and rounded out lines of the exterior of the cap. Great rigidity and strength is obtained by reason of the channel shaped cross section of the reversely bent double side walls and their joint bearing upon the inside of the rim. Yet no special operations have had to be performed upon the rim nor any portion of the metal thereof removed with the result that the rim construction itself is cheaper and the rim both stronger and truer in form.

What I claim as new and useful and desire to protect by Letters Patent is:

1. A sheet metal spoke end cap comprising a transverse bottom portion for securement to the rim and double side walls spaced apart but connected together at the top to form a transverse shoulder providing a spoke end seat.

2. A sheet metal spoke end cap comprising a cup-shaped body portion facing radially outwardly and having its outer side wall adapted to seat against the rim of the wheel and its central portion depressed and adapted to engage the wheel rim for securement thereto and to receive a spoke tenon therein and a shoulder between said recess and the outer side wall of the body of the cap forming an abutment for a shoulder surrounding a spoke at the base of its tenon.

In testimony whereof he hereunto affixes his signature.

J HAROLD HUNT.